United States Patent [19]

Rink

[11] Patent Number: 5,240,310

[45] Date of Patent: Aug. 31, 1993

[54] SEAT BASE FOR VEHICLE SEATS

[75] Inventor: Manfred Rink, Cologne, Fed. Rep. of Germany

[73] Assignee: Bayer Aktiengesellschaft, Leverkusen, Fed. Rep. of Germany

[21] Appl. No.: 910,054

[22] Filed: Jul. 8, 1992

Related U.S. Application Data

[63] Continuation-in-part of Ser. No. 443,771, Nov. 30, 1989.

[51] Int. Cl.⁵ .................................................. A47C 7/02
[52] U.S. Cl. .............................. 297/452.18; 248/429; 248/430
[58] Field of Search ............. 297/452, 457, 340, 341, 297/342, 343; 248/429, 430

[56] References Cited

U.S. PATENT DOCUMENTS

| 4,509,796 | 4/1985 | Takagi | 297/452 |
| 4,585,273 | 4/1986 | Higgs et al. | 297/452 |
| 4,673,215 | 6/1987 | Yokoyama | 297/452 |
| 4,715,651 | 12/1987 | Wakamatsu | 297/452 X |

FOREIGN PATENT DOCUMENTS

| 65116 | 11/1982 | European Pat. Off. | 297/452 |
| 2201088 | 8/1988 | United Kingdom | 297/452 |

Primary Examiner—Peter A. Aschenbrenner
Attorney, Agent, or Firm—Joseph C. Gil

[57] ABSTRACT

A seat base, in particular for a motor vehicle seat, which may be manufactured at reasonable cost, has the necessary strength properties and permits replacement of the upholstery and/or cover is disclosed. The seat base is divided into a dish-shaped upholstery support made from a thermoplastic material and a seat frame. The seat frame is consists of at least two longitudinal supports made from a thermoplastic, high-strength which are connected to one another by means of steel crossbeams.

2 Claims, 2 Drawing Sheets

FIG. 3
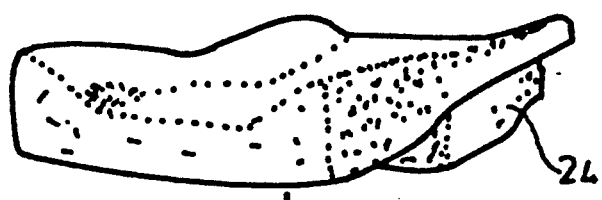
FIG. 2
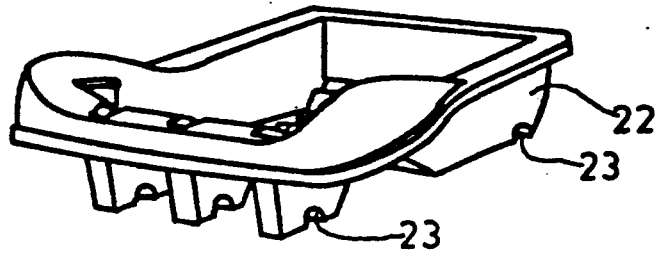
FIG. 4
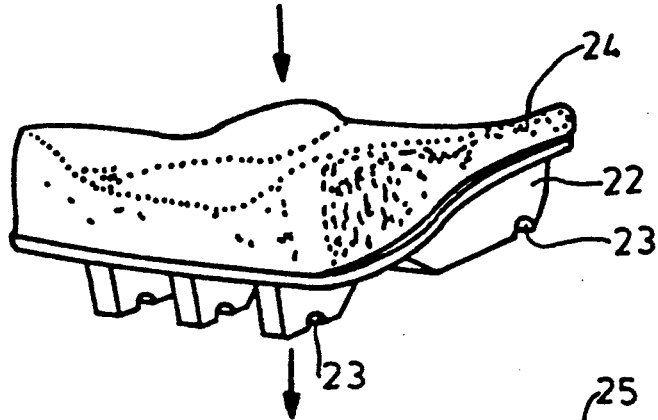
FIG. 5
FIG. 1
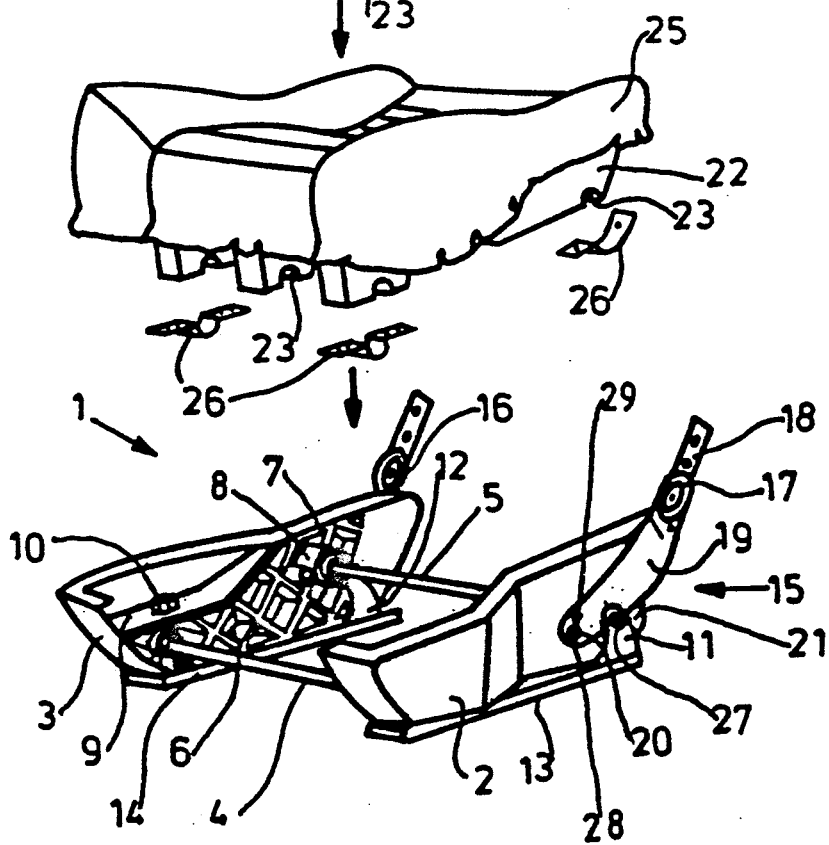

SEAT BASE FOR VEHICLE SEATS

CROSS REFERENCE TO RELATED APPLICATION

This application is a continuation-in-part of U.S. application Ser. No. 07/443,771, filed on Nov. 30, 1989.

BACKGROUND OF THE INVENTION

Typically, seat bases for vehicle seats have been constructed of a steel frame which supports the seat upholstery. This structure has the disadvantage that the whole seat base must generally be replaced when the upholstery or the cover is worn or damaged. In addition, the manufacture and assembly of a seat frame from deep-drawn or curved sheet steel profiles is very costly particularly because welding or riveting processes are involved.

The object of the invention is to provide a seat base which makes the replacement of the upholstery and/or cover relatively simple and which can be manufactured simply and at reasonable cost in series and yet has the necessary strength properties.

BRIEF DESCRIPTION OF THE DRAWINGS

FIG. 1 shows the seat frame of the seat base.
FIG. 2 shows the upholstery support.
FIG. 3 shows the upholstery.
FIG. 4 shows the upholstery support with upholstery,
FIG. 5 shows the upholstery support with upholstery and cover.

DESCRIPTION OF THE INVENTION

Figure 6:
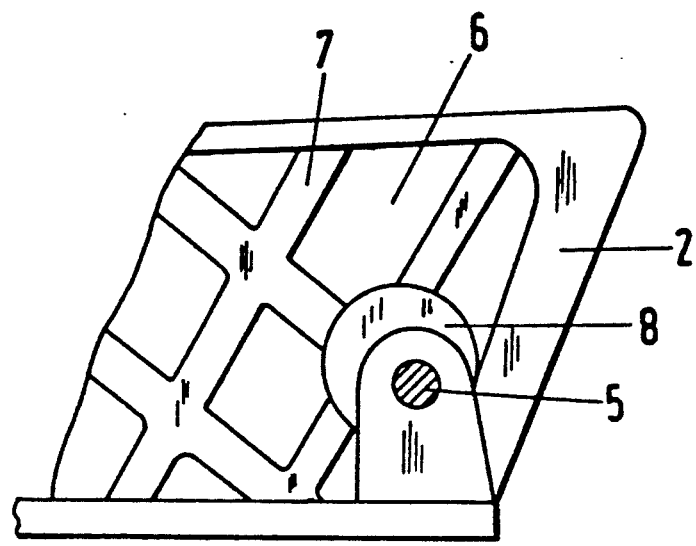
FIG. 6 is an enlarged inside view of the rear area of the seat frame.

The above objects are achieved by means of the novel seat base of the present invention. More particularly, the present invention is directed to a seat base for a vehicle seat which comprises:
A) a seat frame comprising:
  a) a first longitudinal support and a second longitudinal support, both of said supports being made from high strength thermoplastic material, and both of said supports having rear portions and front portions, said first and second supports being connected together and kept in position relative to each other by means of
  b) at least one front steel cross beam and at least one rear steel cross beam, said rear cross beam passing through each of said supports, and being mounted on two pedestals, one of said pedestals being associated with the rear portion of said first support and the other of said pedestals being associated with the rear portion of said second support,
  c) each of said pedestals being attached to a longitudinal rail,
  d) the front portion of said first support being attached to the longitudinal rail associated with the pedestal associated with the rear portion of said first support,
  e) the front portion of said second support being attached to the longitudinal rail associated with the pedestal associated with the rear portion of said second support, and
B) a dish shaped upholstery support made of a thermoplastic material and being detachably mounted upon said cross beams.

In one preferred embodiment, each of the longitudinal supports has a fitting attached to the rear portion thereof, each of said fittings i) being attachable to a seat back, ii) having a swivel joint as a part thereof, and iii) having a snap lock which can interact with the rear cross beam to lock a seat back in position, and wherein when the snap lock is disengaged from the rear cross beam, the seat back will swivel around the swivel joints. The longitudinal rails are adjustable and lockable with guide rails which are fixed to the floor of the vehicle.

Plastics suitable for stress may be used for the upholstery support and the longitudinal supports by making a division into seat frame and upholstery support. The steel cross-beams preferably are tubular; however, other suitable profiles may also be used. All connecting points for the plastic parts (for example, those points where the steel cross-beams may pass through the longitudinal supports) are preferably suitably reinforced. Both upholstery supports and longitudinal supports may be manufactured at reasonable cost in an injection molding process.

In accordance with one embodiment of the invention, the longitudinal supports have a dish shape and their inner space has reinforcing ribs. These reinforcing ribs may be shaped-on directly during injection molding and permit the lowest possible use of material for the longitudinal supports to achieve the required strengths.

The upholstery support is preferably constructed of an acrylonitrile-butadiene-styrene copolymer. In accordance with a further embodiment, the upholstery support is constructed of a blend of a polycarbonate and an acrylonitrile-butadiene-styrene copolymer.

The longitudinal supports are preferably constructed of a reinforced polyamide-6 or a reinforced polyamide-6,6. The preferred reinforcement is glass fiber in an amount of 20 to 40 7t. %.

These high-quality, high-strength plastics guarantee that there is adequate safety, even on overloading, such as in the case of crash accidents, by using appropriate dimensions of the longitudinal supports.

In accordance with a further particular embodiment, the rear steel cross-beam serves as a support for a safety belt. In this case, the end of the steel cross-beam pointing towards the center of the car may serve as a support for the lock or for the strip carrying the lock, whereas the end pointing outwards can serve as a support for the end of the belt. Where the steel cross-beam is a tube, the ends may be provided with internal screw threads such that the strap or the head end can be attached by means of a screw.

In the drawings, the novel seat base is shown purely schematically with an example of the type used for a motor vehicle front seat and is explained in more detail below.

Figure 7:
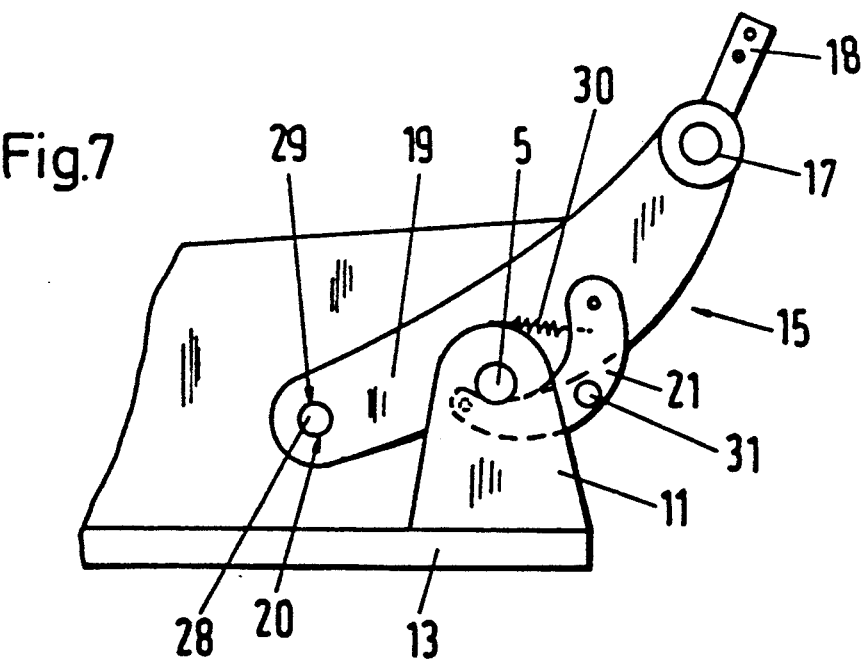
FIG. 7 is an enlarged outside view of the rear area of the seat.

In FIG. 1 (note also FIGS. 6 and 7), the seat frame 1 consists of two longitudinal supports 2, 3 formed essentially as mirror images one of the other, made from polyamide-6 filled with 30 wt. % glass fibers. They are connected rigidly to one another by means of steel cross-beams 4, 5 made of steel tubing. The longitudinal supports 2, 3 have the shape of a dish and their inner space 6 is reinforced by ribs 7 molded on and arranged like a lattice. The longitudinal supports 2, 3 are injection molded articles and are made such that they can be easily removed. Appropriate moldings, for example, the fittings 8 for the steel cross-beams 4, 5, are provided for the attachment of parts.

In the inner space 6 of the longitudinal supports 2, 3, a bearing surface 9 is provided for a retaining screw 10. The rear steel cross-beam 5 projects through the longitudinal supports 2, 3 and is mounted in U-shaped bearing pedestals 11, 12 which are arranged on longitudinal rails 13, 14 which are adjustable and which can be locked on the guide rails attached to the floor of the vehicle (the guide rails and the attachment thereof to the floor of the vehicle are not shown). The bearing pedestals 11, 12 are preferably made from punched or bent steel sheet and serve as tipping supports for the seat frame 1. The longitudinal supports 2, 3 are supported on the longitudinal rails 13, 14. Fittings 15, 16 are arranged on the longitudinal supports 2, 3 for attachment to the seat back (the seat back is not shown). In each case the fittings comprise a joint 17 and a plate 18 for attachment to the seat back and a plate 19 for attachment to the longitudinal support 2. Longitudinal support 3 is similarly equipped. The plate 19 has an eye 20 which together with the steel bolt 28 forms a swivel-joint 29. A snap hook 21 is associated with each fitting 15, 16, the steel cross-beam 5 serving as an outer bearing for each fitting 15, 16. The snap hook is provided with a release spring 30 and a handle 31 (see FIG. 7). If the snap hook 21 is released, the seat back can be folded forwards by means of the swivel-joint 29.

The upholstery support 22 of FIG. 2 is also manufactured in an injection molding process, preferably from an ABS copolymer. It has the shape of a bath tub and has recesses 23 molded on the underside, into which the steel cross-beams 4, 5 (FIG. 1) can engage.

The upholstery 24 of FIG. 3 consists of mold-foamed polyurethane soft foam and is shaped in the conventional manner. In FIG. 4, the upholstery 24 is placed in the upholstery support 22. In FIG. 5, the cover 25 is shown in position. The upholstery support 22 together with the upholstery 24 and cover 25 may then be assembled on the seat frame 1 (FIG. 1), wherein after locking the steel cross-beams 3, 4 in the recesses 23, the retaining stirrups 26 indicated (FIG. 5) are screwed against the upholstery support 22 from below such that the steel cross-beams 4, 5 are fixed between upholstery support 22 and retaining stirrups 26. The left-hand end of the steel cross-beam 5 is formed as a support for the strap of a lock of a safety belt (not visible). The right-hand end serves as a support 27 for one end of the safety belt (not shown).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A seat base for a vehicle seat comprising:
   A) a seat frame comprising:
      a) a first longitudinal support and a second longitudinal support, both of said supports being made from high strength thermoplastic material, and both of said supports having rear portions and front portions, said first and second supports being connected together and kept in position relative to each other by means of
      b) at least one front steel cross beam and at least one rear steel cross beam, said rear cross beam passing through each of said supports, and being mounted on two pedestals, one of said pedestals being associated with the rear portion of said first support and the other of said pedestals being associated with the rear portion of said second support,
      c) each of said pedestals being attached to a longitudinal rail,
      d) the front portion of said first support being attached to the longitudinal rail associated with the pedestal associated with the rear portion of said first support,
      e) the front portion of said second support being attached to the longitudinal rail associated with the pedestal associated with the rear portion of said second support, and
   B) a dish shaped upholstery support made of a thermoplastic material and being detachably mounted upon said cross beams.

2. The seat base of claim 1 wherein each of said longitudinal supports has a fitting attached to the rear portion thereof, each of said fittings
   i) being attachable to a seat back,
   ii) having a swivel joint as a part thereof, and
   iii) having a snap lock which can interact with said rear cross beam to lock a seat back in position, and wherein when said snap lock is disengaged from said rear cross beam, said seat back will swivel around said swivel joints.

* * * * *